United States Patent [19]
Player et al.

[11] Patent Number: 5,358,548
[45] Date of Patent: Oct. 25, 1994

[54] CONDENSATION OF METAL VAPOURS IN A FLUIDIZED BED AND APPARATUS

[75] Inventors: Roger L. Player, Mount Isa; Rodney J. Dry, Glen Waverley, both of Australia

[73] Assignees: Mount Isa Mines Limited, Brisbane; Commonwealth Scientific and Industrial Research Organisation, Campbell, both of Australia

[21] Appl. No.: 855,019

[22] PCT Filed: Nov. 7, 1990

[86] PCT No.: PCT/AU90/00535
  § 371 Date: Jun. 29, 1991
  § 102(e) Date: Jun. 29, 1991

[87] PCT Pub. No.: WO91/07225
  PCT Pub. Date: May 30, 1991

[30] Foreign Application Priority Data
  Nov. 8, 1989 [AU] Australia ............... PJ 7283

[51] Int. Cl.$^5$ ............................................. C22B 9/02
[52] U.S. Cl. ...................................... 75/381; 75/385; 75/595; 75/624; 75/665; 75/669; 75/690; 75/694
[58] Field of Search ............... 75/414, 665, 690, 694, 75/595, 669, 624, 381, 385; 266/148, 669, 690, 694; 55/72, 79

[56] References Cited

U.S. PATENT DOCUMENTS

| | | |
|---|---|---|
| 4,083,926 | 4/1978 | Ballain et al. . |
| 4,108,968 | 8/1978 | Jacobs et al. . |
| 4,120,668 | 10/1978 | Fraley ........................ 55/72 |
| 4,124,682 | 11/1978 | Jacobs et al. . |
| 4,428,771 | 1/1984 | Nowak et al. . |
| 4,435,364 | 3/1984 | Vorres . |
| 4,508,566 | 4/1985 | Eriksson et al. . |
| 5,013,355 | 5/1991 | Elvander et al. ............ 75/694 |

FOREIGN PATENT DOCUMENTS

| | | |
|---|---|---|
| 553033 | 5/1986 | Australia . |
| 63275 | 6/1989 | Australia . |
| 67311 | 1/1990 | Australia . |
| 17095 | 4/1991 | Australia . |
| 0426638 | 6/1981 | European Pat. Off. . |
| 3138861 | 5/1982 | Fed. Rep. of Germany . |
| 34377 | 10/1989 | World Int. Prop. O. . |

*Primary Examiner*—Melvyn J. Andrews
*Attorney, Agent, or Firm*—Leydig, Voit & Mayer

[57] ABSTRACT

Metal vapor, for example zinc fume in the offgas of a smelting furnace, is captured by bringing the stream into direct contact with a fluidized bed of solid particles having a particulate loading of greater than 10 kg/m$^3$ and preferably greater than 400 kg/m$^3$. The thermal mass and temperature of the bed is such as to rapidly quench the vapor in the case of zinc from above 960° C. to below 419° C. in less than 100 milliseconds, whereby the vapor condenses in the bed and is recovered as zinc metal in acceptable yield.

40 Claims, 2 Drawing Sheets

5,358,548

CONDENSATION OF METAL VAPORS IN A FLUIDIZED BED AND APPARATUS

TECHNICAL FIELD

The present invention relates to the capture of metal vapours from a gas stream, for example zinc vapour from the offgas of a smelting furnace.

BACKGROUND

Traditional methods of extracting zinc from sulphides involve roasting the concentrate to remove sulphur followed by reduction during which some or all of the zinc is removed as a fume. The zinc is then recovered from the fume by condensation.

Similar processes are used for the recovery of other relatively volatile metals from sulphides. Although the invention will be herein described primarily with reference to the recovery of zinc it will be understood to be applicable to other metals including tin, lead, magnesium, cadmium, manganese or the like which may be produced by pyrometallurgical means involving fuming. The term "fume" as herein used refers primarily to a gas or vapour but includes a gas or vapour with entrained liquid and/or particulate matter.

Zinc blast furnaces, for example, generally use a lead splash condenser (e.g. such as described in British Patent 572961) to capture zinc vapour as zinc liquid and lower the activity of the condensed product. This approach involves relatively large capital investment and has high maintenance costs.

Another form of metal vapour capture currently in use relates to removal of zinc as fume from slag from lead production facilities, with subsequent oxidation. In that process, zinc vapour is fumed from the surface of a molten slag bath and is allowed to travel upwardly until it reaches a location well clear of turbulence associated with the bath surface. At that location an oxygen-containing gas such as air is admitted, and both temperature and oxygen potential are raised to the point where the zinc vapour is rapidly converted to zinc oxide. The zinc oxide has a very much lower vapour pressure than zinc metal and as a result precipitates from the gas stream as a fine powder. The zinc oxide is suitable for further purification by electrochemical methods, but must first be captured in suitable dust extraction equipment. This very fine dust is difficult to handle, and its capture once again requires large capital investment.

It has been found that by appropriate adjustment of temperature and oxygen potential in a furnace it is possible to achieve commercially significant direct separation of metal as a vapour from sulphide containing materials. However, in this case the furnace offgas contains sulphur dioxide together with the metal vapour and the sulphur dioxide reacts with molten metal in the splash condenser. Accordingly, it has hitherto been considered that the vapour would need to be oxidized prior to recovery.

THE INVENTION

An object of the present invention is to provide improved and/or more cost-effective means for recovery of a metal from a hot gas stream including the metal as a vapour, and more particularly for recovery of the metal in acceptable yield when there are species in the gas stream which are reactive with the metal.

The invention achieves that object by condensation of metal vapour directly from hot offgas on or in the vicinity of the comparatively cool surface of solid particles in a fluidized bed.

According to one aspect the invention consists in a method of recovery of a metal from a gas stream containing the metal as a vapour, said method comprising the steps of:
(a) bringing the stream into direct contact with a fluidized bed of solid particles, the bed having a particulate loading of greater than 10 Kg/m$^3$ and
(b) controlling the fluidized bed so as to include an inventory of particles having a combined mass, specific heat and temperature such as to rapidly reduce the temperature of the vapour in heat exchange relationship with the bed to below the condensation temperature of the metal, whereby to condense the metal vapour.

Furnace offgas streams sometimes contain particulate matter either as a result of entrainment in the furnace, or of introduction of abrasives to reduce accretion on downstream cooling surfaces to improve heat recovery.

However, in such cases the particulate density is low, that is to say not greater than 10 Kg/m$^3$ and usually much less. In the present case the fluidized bed has a particulate loading which is preferably greater than 200 Kg/m$^3$, more preferably greater than 400 Kg/m$^3$ and as much as 1600 Kg/m$^3$ or more.

Preferably, the thermal mass (mass multiplied by specific heat) of particles in the fluidized bed is such that if the bed were uncooled, the rate of temperature rise of the bed in heat exchange relationship with the furnace offgas would be less than 100° C./sec and desirably less than 20° C./sec.

For preference the offgas stream has a temperature metal rather than as an oxide thereby avoiding the need subsequently to convert oxides to metal by electrowinning.

In the case of zinc condensation it is well known that, thermodynamically, zinc vapour reverts to zinc oxides or sulphides as a typical zinc-laden smelter offgas containing oxygen and sulphur dioxide cools (e.g. from 1200° C. to 500° C). The formation of such non-metallic materials has been a major obstacle in the path of development of direct condensation processes in the past.

The current invention seeks to avoid that difficulty by the rapidity of the quench action involved. A thermodynamic driving force for the formation of non-metallic compounds is allowed, but the actual formation of such compounds is inhibited by kinetic factors. It has been found that reaction rates for the formation of undesired (non-metallic) materials are such that, at low temperatures (e.g. 100° C.–350° C.), formation is too slow to be significant in this context even though the thermodynamic driving force is strong. The quench action involves cooling the hot smelter offgas (e.g. at from 1200° C. to 1300° C. when containing sulphur dioxide) to a temperature below the melting point of the metal of the vapour very rapidly. The result is an effective system which avoids many of the difficulties and economic penalties associated with of above 960° C. (more preferably above 1100° C.) upon entry to the fluidized bed and the temperature of the gas leaving the bed is reduced to below about 500° C. (essentially to below the condensation temperature of the metal vapour and preferably to below the melting point of the metal to be condensed, e.g. to below 419° C. in the case of zinc, to below 327° C. in the case of lead, and to below 321° C. in the case of tin) within a period of less than 1 second, more preferably less than 100 millisecs and desirably less than 1 millisec.

Desirably the offgas stream is produced in a generally closed furnace containing a bath into which is injected gas via a submerged lance and the offgas is brought into contact with the fluidized bed particles without prior exposure to precooling devices.

The present invention aims at capturing metal vapour directly from hot offgas by condensation on, or in the vicinity of, the surface of cool particles in the fluidized bed. In preferred embodiments of the invention there is direct coupling between the smelting furnace and the fluidized bed used for condensation—that is to say there is no significant attempt at heat recovery located between the furnace and the fluidized bed. Desirably, steps are taken to maintain or increase the offgas temperature relative to the bath temperature. Further, the invention recovers a high proportion if not all of the metal as the elemental current technology.

The exact form of the fluidized bed system is believed to be not critical. It may be a shallow bubbling/spouted bed, or a circulating fluidized bed. Whichever form the system takes, it should be designed to maintain a significant inventory of cool particles in the vicinity of the hot gas entry point into the bed. The particles are selected to have a thermal mass that is large by comparison with that of the incoming gas and, in addition, to have a large effective surface area exposed to the gas for heat and mass transfer. The result is an extremely fast quench (of less than 1 second, typically less than 100 milliseconds and desirably less than 1 millisecond) which prevents excessive formation of undesired materials e.g. reversion to sulphur or oxygen compounds of the metal.

The nature of the particulate solid used is also not critical, though it is advantageous to use solids of the same material as that being condensed. With appropriate seeding, it is possible to operate the condensation unit as a direct producer of particulate metal. The particle size range depends on the application, but it is generally advantageous to operate with as fine a distribution as can be retained in the system. Maximum grain size in the bed is preferably less than 2 mm, and more preferentially is less than 0.5 mm.

Energy balance constraints are such that heat removal from the fluidized bed is needed. This may be achieved in a number of ways such as by direct water addition or heat transfer to a cooling fluid. In the case of a cooling fluid, the layout of the required heat transfer area is a matter of engineering convenience and depends on the form of fluidized bed chosen.

DESCRIPTION OF PREFERRED EMBODIMENTS

Two embodiments in accordance with the current invention will now be described by way of example only, with reference to the accompanying drawings in which.

The first of these schematically illustrates non-recirculating fluid bed condensation, and the second schematically illustrates circulating fluid bed (CFB) condensation.

NON-RECIRCULATING CONDENSATION

Figure 1:
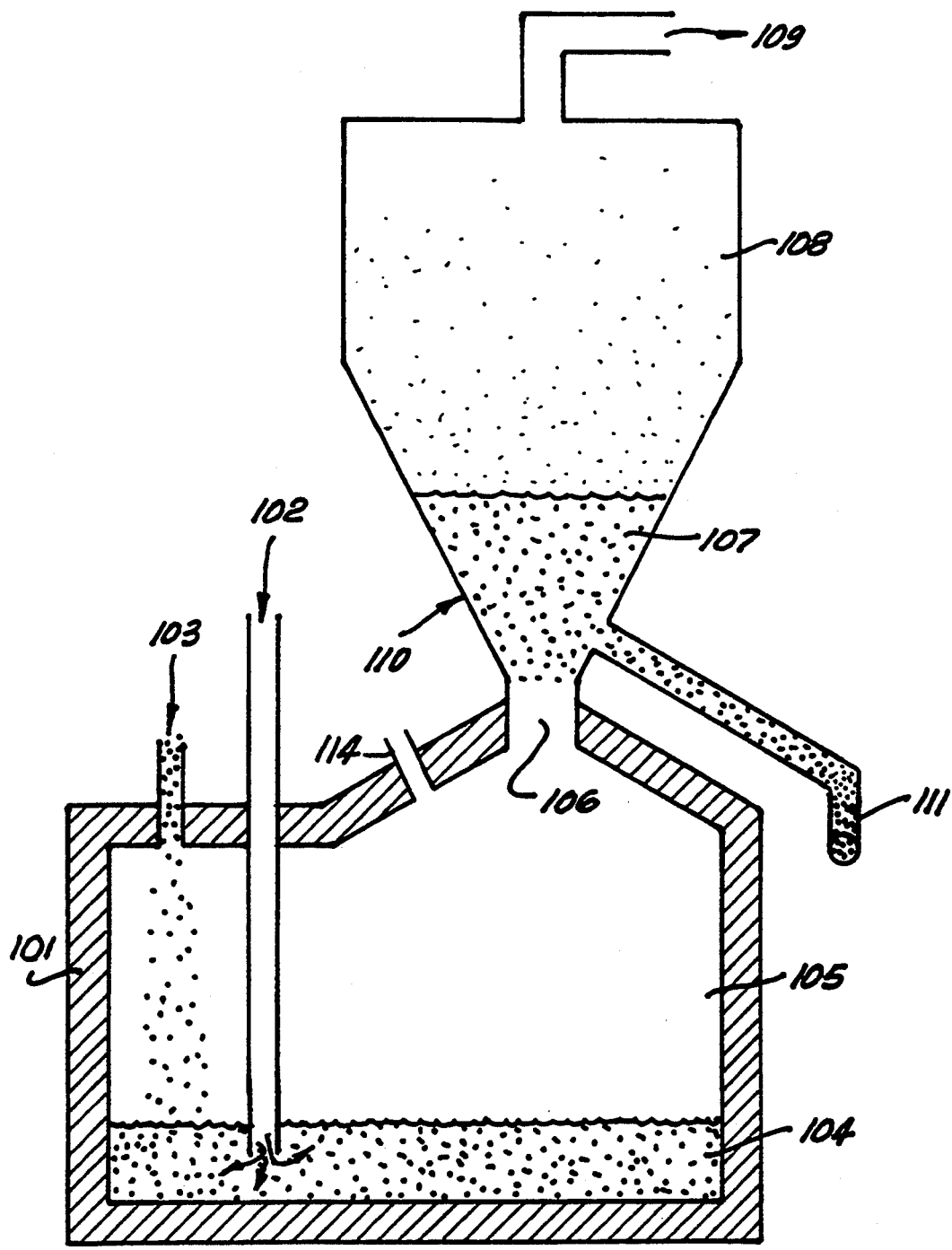
FIG. 1 is a bath-smelting furnace of a non-recirculating form.

With reference to FIG. 1, furnace 101 is maintained at an appropriate furnace temperature (e.g. bath temperature 1200° C.) and oxygen on oxidation potential by the introduction of an oxygen-containing gas via a lance 102 and ore/slag/coal feed 103. Metal vapour, for example zinc vapour in the case of zinc smelting, leaves liquid bath 104 and enters gas space 105 with furnace offgases, and from here flows into throat 106. The velocity in this throat is maintained at a value which prevents solids from falling downward from the fluidized bed into furnace 101.

The upwardly expanding duct above throat 106 contains cool (below 500° C. and preferably below 419° C. in the case of zinc, for example about 360° C.) metal particles in the form of a dense fluidized bed 107 defining a first zone. Average bed density is in the range of from 200 to 1600 Kg/m$^3$ and preferably above 400 Kg/m$^3$. A rapid quench is achieved as the hot furnace gas at above 960° C., and preferably above 1100° C., comes into contact or at least into heat exchange relationship with the particulate material, and material condenses on the surface of or in the vicinity of the particles. Particle diameters of less than 2 mm are preferred, and more preferably less than 0.5 mm diameter.

Cooled gas disengages from the solid in freeboard region 108, and leaves the system via outlet 109.

Cooling of fluidized bed 107 is achieved for example by a combination cooling surface on the walls of the vessel, tube bundles within the vessel and/or water spray injection 110. A valved duct 111 is provided for draining solids rapidly from the system—this is used primarily for metal recovery, shutdown and in emergencies.

An inlet conduit or pipe 114 is provided for controlling the oxidation of the metal vapor being brought into contact with the fluidized bed. This can be achieved by (i) introducing inert gases to the furnace through the pipe, (ii) closing the pipe to prevent air ingress or (iii) introducing air through the pipe for afterburning of the furnace gases.

RECIRCULATING CONDENSATION

Figure 2:
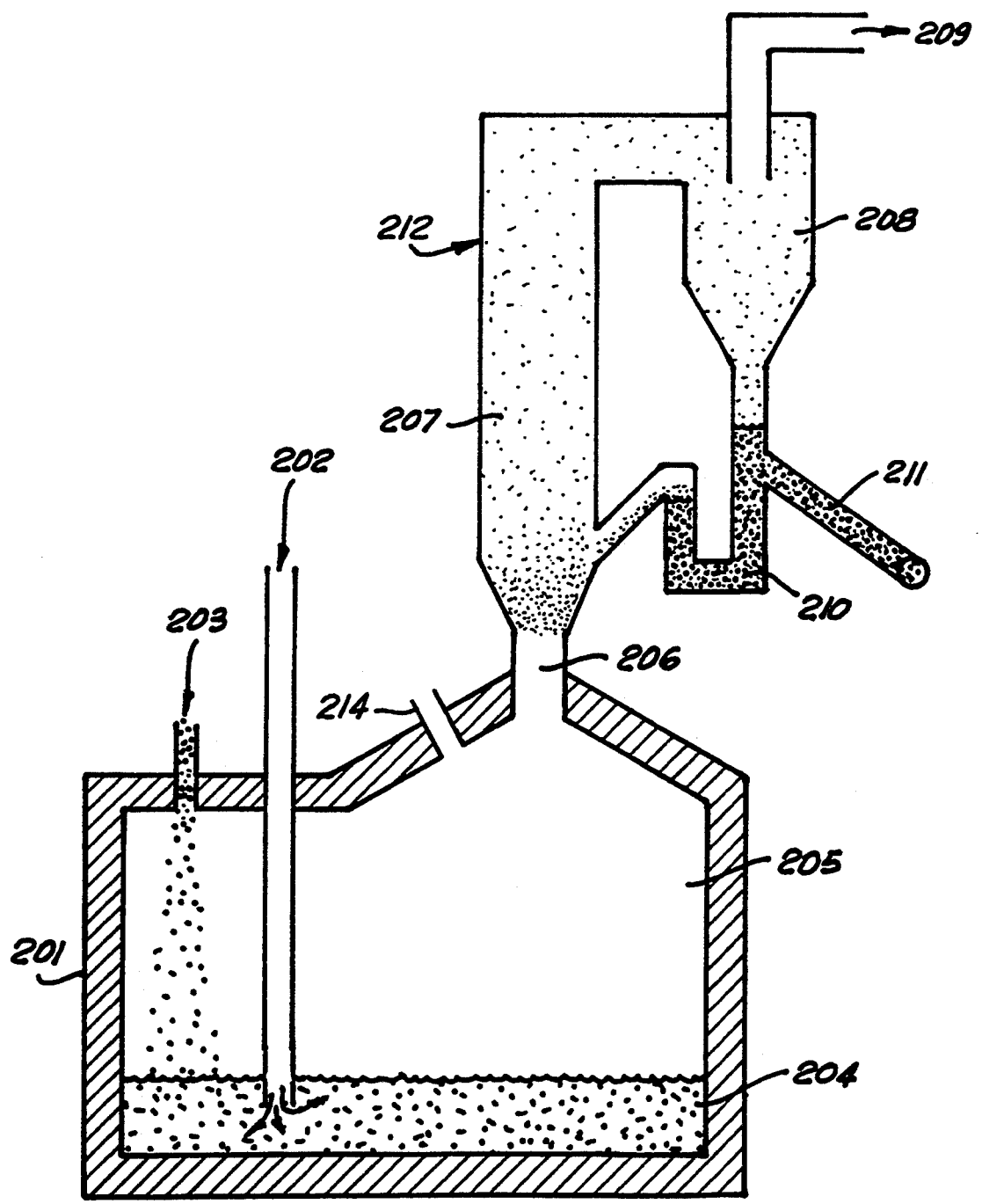
FIG. 2 is a bath-smelting furnace of a recirculating form.

Identification numbers 201 to 206 identify parts of FIG. 2 which correspond in function to parts 101 to 106 of FIG. 1, and this system differs from that described previously only in the form of the fluidized bed used above throat 206.

In the CFB embodiment a vertical riser 207 is provided, and gas velocity in this duct (first zone) is such that average suspension densities in the range 10 to 400 Kgs. per cubic meter are maintained, preferably 200 to 400 Kgs/m$^3$ in the first zone. These gas velocities are in the range of from 2 to 15 m/s. Gas and entrained solids leaving the top of the riser enter a cyclone 208, and gas leaves the system via outlet 209. Solids captured in the cyclone are returned to the lower region of the riser via a suitable transfer device, a loopseal 210 being one such device.

The product metal may be removed continuously by means of one or more cyclones 208 from which gas free of particles is discharged at outlet 209. A proportion of solids recovered in the cyclone 208 are cooled at a second zone and directed back into the fluid bed while the remainder is collected as product via a valved duct 211.

Fluidized bed cooling is achieved via heat transfer surface, for example on the walls of the riser and/or the walls of the cyclone and/or tube bundles in the riser. Water spray-cooling 212 is optionally used.

Reducing the gas temperature to below 419° C. ensures in the case of zinc, that the particles are below the melting point of the metal so that the particles grow directly from the vapour without formation of molten zinc. However, the process is not limited to use in zinc vapour condensation. In both illustrated embodiments particles of fine slag, sand, or metal from previous operation, may be used to establish the initial fluid bed.

An inlet conduit or pipe 214 is provided for controlling the oxidation of the metal vapor being brought into contact with the fluidized bed. This can be achieved by (i) introducing inert gases to the furnace through the pipe, (ii) closing the pipe to prevent air ingress or (iii) introducing air through the pipe for afterburning of the furnace gases.

EXAMPLE

A recirculating fluid bed condenser with a riser of 200 mm in diameter and 3 m high was set up on a furnace in which zinc containing lead blast furnace slag could be melted at 1200° C. and reduced with coal to form a source of metallic zinc vapour for the condenser. In addition, the gases were enriched with metallic zinc vapour by also feeding solid metallic zinc into the furnace, to be melted and evaporated. The blast furnace slag was fed at a rate of 140 Kg per hour and the zinc metal fed at 26 Kg per hour. This yielded a total zinc feed rate of 44 Kg per hour. After the furnace was heated to temperature and stabilised the circulating fluid bed condenser was fitted onto the furnace and operated for 40 minutes.

The recirculating fluid bed condenser was prepared for operation as follows.

Cold air was drawn through the condenser at 250 Nm³/hr and crushed silica was added to form a fluidised bed of density approximately 400 Kg/m³. The recirculating rate of solids through the cyclone assembly and return to the bed was 2 Kg/sec, and the particle size, after multiple recirculation through the bed was shown in Table 1. More than 90% of the particles had a mean volume diameter of less than 0.5 mm. The condenser was then lowered into the furnace, air excluded, and gases containing zinc vapour drawn into the condenser. The bed temperature was held at 190° C. by cooling water circulating in external jackets around the bed. A typical heat extraction rate into the cooling water was 68 kW. During the course of the test the temperature of the zinc vapour at the entry to the fluid bed ranged from 960° to 1100° C. with an average temperature of 1030° C. Zinc metal condensed on the surface of the bed material.

Samples of the bed material were taken periodically. The results are given in Table 2.

It was seen that the total zinc content of the bed material progressively increased up to 15% by weight, over the 40 minutes of the test. The metallic zinc content of the bed material was consistently 60% of the total zinc content; the remainder being zinc oxide and zinc sulphide. Thermodynamic calculations of the equilibrium distribution of zinc between the three phases, zinc metal vapour, zinc oxide and zinc sulphide, are given in Table 3 for the conditions of the test for a range of gas inlet temperatures to the condenser.

Under equilibrium conditions a metallic zinc fraction of about 60% would be obtained at an inlet vapour temperature of 880° C. This is about 150° C. lower than the measured operating temperature of the vapour inlet to the condenser. This temperature difference may reflect the non-equilibrium nature of the condenser. Additionally in this test the yield of the metal was also depressed by air leakage into the bed via an unintentional leak in the loop seal 210. It is anticipated that in practice a closer approach to equilibrium could be achieved with a correspondingly higher yield of zinc as zinc metal.

TABLE 1

| Particle Size of Circulating Fluid Bed Condenser Bed Material | |
|---|---|
| Size* (μm) | Volume % |
| 11 | 0 |
| +11–15.6 | 0.6 |
| 15.6–22 | 2.3 |
| 22–31.1 | 5.0 |
| 31.1–44 | 8.2 |
| 44–62.2 | 10.5 |
| 62.2–88 | 12.3 |
| 88–124 | 12.4 |
| 124–176 | 11.3 |
| 176–249 | 10.7 |
| 249–352 | 9.7 |
| 352–498 | 12.6 |
| 498–704 | 4.6 |

* = Mean volume diameter

TABLE 2

| Chemical analysis of the Bed Material Sampled from the Circulating Fluid Bed Condenser | | | | | | | | | | | | |
|---|---|---|---|---|---|---|---|---|---|---|---|---|
| OPERATING TIME OF CONDENSER (mins) | Total Zn | Metallic Zn | Percentage Metallic to total Zn | ANALYSIS (%) | | | | | | | | |
| | | | | S | Pb | Fe | Cu | SiO₂ | CaO | Al₂O₃ | MgO | |
| 0 | 0.06 | 0 | 0 | 0.04 | 0.03 | 0.81 | 0.05 | 93.9 | 0.62 | 1.81 | 0.16 | |
| 20 | 8.4 | 5.1 | 60.6 | 0.31 | 0.78 | 0.57 | 0.04 | 86.1 | 0.46 | 0.97 | 0.08 | |
| 30 | 9.1 | 5.65 | 62.1 | 0.35 | 0.77 | 0.54 | 0.04 | 85 | 0.43 | 0.9 | 0.08 | |
| 40 | 15.6 | 9.1 | 58.0 | 0.67 | 1.00 | 0.54 | 0.04 | 75.7 | 0.39 | 0.83 | 0.09 | |

TABLE 3

Equilibrium Zinc Distribution Between Zinc Vapour, Zinc, Oxide and Zinc Sulphide as a Function of the Temperature for the Conditions of the Example

| TEMPERATURE °C. | % DISTRIBUTION | | |
|---|---|---|---|
| | Zinc Vapour | ZnO | ZnS |
| 460 | 47.8 | 46.0 | 6.2 |
| 880 | 61.9 | 31.9 | 6.2 |
| 900 | 78.5 | 15.3 | 6.2 |
| 920 | 93.8 | 0.0 | 6.2 |
| 1030 | 93.8 | 0.0 | 6.2 |

In practice of the invention it is desirable to control the oxygen potential in the vapour stream entering the bed, If the gas stream contains reactive species which are in chemical equilibrium with the metal, then the partial pressure of oxygen in the gas stream is controlled to promote the formation of the metal and inhibit formation of reaction or reversion products, In the present example the oxygen partial pressure is controlled to inhibit the formation of zinc sulphides or oxides under chemical equilibrium conditions, The optimum oxygen potential at the point of entry of the gas stream to the bed is typically significantly different from that which is the optimum in the smelting bath in the furnace.

Oxygen concentration in the vapour stream at the entrance to the bed can be controlled by introducing inert gases to the furnace, or by maintaining a positive pressure to prevent air ingress, or by adjusting feeds to consume a predetermined ratio of oxygen, or by use of afterburners located between the bath and the fluidized bed as indicated by reference numerals 114 and 214 in FIGS. 1 and 2, respectively.

Likewise, the temperature of the vapour entering the fluidized bed may be controlled at an elevated level by use of afterburners or other heaters and/or by furnace design to minimize heat loss prior to quenching.

The furnace gas stream might include as reactive species, by way of further example:

sulphur containing species such as sulphur dioxide, sulphur and hydrogen sulphide, oxygen containing species such as sulphur dioxide, carbon dioxide and carbon monoxide and water vapour, halogen containing species such as hydrogen chloride, hydrogen fluoride and chloride, and NOX species.

Typically the gas stream will include a mixture of such species which will vary according to the source of the metal and of other furnace contents and operating conditions.

By way of example the calculated composition of the gas stream for a zinc smelter is shown in Table 4.

TABLE 4

CALCULATED COMPOSITIONS FOR ZINC SMELTING

| Conditions | SLAG FUMING 250 kg Furnace Batch Processing | CONCENTRATE SMELTING 3 tph Continuous Smelting; Batch Tap |
|---|---|---|
| Furnace off gas | | |
| Temperature (°C.) | 1200 | 1300 |
| Composition Zn (Vol %) | 1.3 | 5.1 |
| $SO_2$ | <0.01 | 6.6 |
| $CO_2$ | 5.9 | 9.1 |
| CO | 15.6 | 1.0 |
| $H_2$ | 8.9 | 0.3 |
| $H_2O$ | 8.1 | 8.3 |
| Balance $N_2$ etc. | 60.2 | 69.6 |

In each case, the oxygen potential and temperature at entry to the bed which will result in optimum recovery of elemental metal can be determined based upon the teaching hereof by routine experiment.

Photomicrographic evidence indicates that a significant proportion of the metal vapour condenses in the vicinity of the fluidized bed particles rather than on the surface of bed silica particles. A proportion of the metal is thus recovered in the form of very fine metal particles (for example 0.2 micrometers or less) devoid of silica. Much of the metal found on the fluidized bed silica particles is believed to be deposited on the bed silica particles by impact with fine metal particles.

The metal particles and metal coated bed particles may be separated from the gas stream by conventional means including cyclones, bag house filters and the like.

Although the invention has been described primarily with reference to the recovery of metals from gas streams in which species reactive with the metal are present, the invention is also applicable for the recovery of metals in the absence of such species for example in metal purification.

As will be appreciated by those of ordinary skill in the art from the teaching hereof, the invention may be conducted by other means without departing from the concept herein disclosed.

We claim:

1. A method of recovery of elemental metal from a gas stream containing the metal as a vapor, said method comprising:
   (a) bringing the stream into direct contact with a fluidized bed of solid particles, the bed having a particulate loading of greater than 10 $Kg/m^3$;
   (b) controlling the fluidized bed so as to include an inventory of particles having a combined mass, specific heat and temperature such as to rapidly reduce the temperature of the vapor in heat exchange relationship with the bed to below the condensation temperature of the metal, thereby condensing the metal vapor as elemental metal; and
   (c) controlling the oxygen potential of the stream to be brought into contact with the bed so as to maximize the recovery of the vapor as elemental metal.

2. A method according to claim 1 wherein the gas stream is a furnace offgas stream and contains a species reactive with the metal vapour, said method further comprising
   (a) maintaining the offgas stream at a temperature substantially equal to or greater than the furnace temperature prior to contact with the bed,
   (b) controlling the fluidized bed so as to include an inventory of particles having a combined mass, specific heat and temperature such as to reduce the temperature of the offgas stream in heat exchange relationship with the bed to below the condensation temperature of the metal at a rate of change of temperature selected to minimize reaction between the vapour and the reactive species whereby to condense the metal vapour and
   (c) separating the condensed metal from the remaining stream.

3. A method according to claim 2 wherein the temperature of the gas leaving the bed is reduced to below the melting point of the metal.

4. A method according to claim 3 wherein the temperature at which the gas stream is brought into contact with the bed and the average temperature of particles in the bed is selected so as to optimize the recovery of the vapour as elemental metal.

5. A method according to claim 1 wherein the fluidized bed has a particulate loading of greater than 400 $Kgs./m^3$.

6. A method according to claim 1 wherein the particulate loading is greater than 200 $Kg/m^3$.

7. A method according to claim 4 wherein the gas stream has a temperature greater than 960° C. upon entry to the fluidized bed.

8. A method according to claim 7 wherein the gas stream has a temperature greater than 1100° C. upon entry to the fluidized bed.

9. A method according to claim 3 wherein the temperature of the gas stream upon leaving the bed is reduced to below 500° C.

10. A method according to claim 9 wherein the temperature of the gas stream upon leaving the bed is reduced to below 350° C.

11. A method according to claim 1, wherein the thermal mass of the bed in heat exchange relationship with the gas stream is such that in the absence of cooling the rise in temperature of the bed would be less than 100° C./sec.

12. A method according to claim 11 wherein the thermal mass of the bed in heat exchange relationship with the offgas stream is such that in the absence of cooling the rise in temperature of the bed would be less than 20° C./sec.

13. A method according to claim 1, wherein the particles of the bed have an average grain size not exceeding 2 mm in diameter.

14. A method according to claim 3, wherein 90% of the particles of the bed have a grain size not exceeding 0.5 mm in diameter.

15. A method according to claim 1, wherein the metal vapour is zinc.

16. A method according to claim 1 wherein the particles of the bed are metal particles of the same metal as the metal of the vapour.

17. A method according to claim 1 wherein the particles of the bed are silica.

18. A method according to claim 1 further comprising the step of continuously removing a proportion of the solids in the fluidized bed and recovering the condensed metal therefrom.

19. A method according to claim 18 wherein the fluidized bed is a continuously recirculating fluidized bed.

20. A method according to any one of the preceding claim 19 wherein the metal of the vapour is selected from the group consisting of zinc, lead, tin, magnesium, cadmium and manganese.

21. A method according to claim 20 wherein the metal is zinc.

22. A method according to claim 20 wherein the metal is tin.

23. A method according to claim 20 wherein the metal is lead.

24. A method according to claim 20 wherein the metal is magnesium.

25. A method according to claim 1 wherein the gas stream contains a plurality of metals each as a vapour.

26. A method according to claim 2 wherein the gas stream contains one or more reactive species selected from the group consisting of sulphur, oxygen, halogen or nitrogen containing species.

27. A method according to claim 26 wherein the gas steam contains at least one reactive species selected from the group consisting of sulphur, sulphur dioxide and hydrogen sulphide.

28. A method according to claim 2 wherein the gas stream contains at least one reactive species selected from the group consisting of carbon dioxide, carbon monoxide or water.

29. A method according to claim 2 wherein the gas stream contains at least one reactive species selected from the group consisting of hydrogen halides and halogens.

30. A method according to claim 2 further comprising the step of controlling the oxygen potential of the gas stream so as to inhibit reaction between the reactive species and the metal.

31. A method according to claim 1 further including the step of heating the gas stream so that the temperature at which the vapour is brought into contact with the bed is greater than the furnace temperature.

32. A method according to claim 1 wherein the temperature of the gas stream in heat exchange relationship with the bed is reduced to below the condensation temperature of the metal in less than 1 second.

33. A method according to claim 32 wherein the temperature of the gas stream in heat exchange relationship with the bed is reduced to below the condensation temperature of the metal in less than 100 milliseconds.

34. A method according to claim 32 wherein the temperature of the gas stream in heat exchange relationship with the bed is reduced to below the condensation temperature of the metal in less than 1 millisecond.

35. Apparatus for recovery of a metal from a hot gas stream containing the metal as a vapor, said apparatus comprising:
    means for fluidizing a bed to form a fluidized bed of solid particles having a particulate loading of greater than 10 kilograms per cubic meter;
    means for bringing a hot gas stream having an oxygen potential into direct contact and heat exchange relationship with the fluidized bed at a first zone;
    means for maintaining an inventory of particles of the fluidized bed in the first zone at a temperature below the condensation temperature of the hot gas stream metal vapor; and
    means for controlling the oxygen potential of the hot gas stream to be brought into contact with the fluidized bed so as to maximize the recovery of the vapor as elemental metal.

36. Apparatus for recovery of a metal from a hot gas stream containing the metal as a vapor, said apparatus comprising:
    means for producing a hot gas stream;
    means for fluidizing a bed of solid particles having a particulate loading of greater than 10 kilograms per cubic meter;
    means for bringing the hot gas stream having an oxygen potential into direct contact and heat exchange relationship with the fluidized bed at a first zone;
    means for maintaining an inventory of particles of the fluidized bed in the first zone at a temperature below the condensation temperature of the hot gas stream; and
    means for controlling the oxygen potential of the hot gas stream to be brought into contact with the fluidized bed so as to maximize the recovery of the vapor as elemental metal.

37. An apparatus according to claim 36 wherein said means for producing a hot gas stream comprises a furnace including means for containing a bath and a submerged lance in said bath through which gas is injected.

38. Apparatus according to claim 35 wherein the means for maintaining an inventory of particles of the fluidized bed in the first zone at a temperature below the condensation temperature of the hot gas stream metal vapor includes water spray injectors.

39. Apparatus according to claim 35 further comprising means for separating a portion of the solids in the fluid bed from the remainder.

40. Apparatus according to claim 35 including means for raising the temperature of the hot gas stream to above the furnace temperature.

* * * * *

UNITED STATES PATENT AND TRADEMARK OFFICE
CERTIFICATE OF CORRECTION

PATENT NO. : 5,358,548
DATED : October 25, 1994
INVENTOR(S) : Player et al.

It is certified that error appears in the above-indentified patent and that said Letters Patent is hereby corrected as shown below:

TITLE PAGE

Item [86], line 2, change "1991" to --1992--;
line 3, change "1991" to --1992--;

Column 8, line 35, after "comprising" insert --:--;

Column 9, line 37, delete "any one of the preceding";

Signed and Sealed this

Twenty-first Day of March, 1995

Attest:

BRUCE LEHMAN

Attesting Officer          Commissioner of Patents and Trademarks